US005539728A

United States Patent [19]
Gaiani et al.

[11] Patent Number: 5,539,728
[45] Date of Patent: Jul. 23, 1996

[54] METHOD AND DEVICE FOR POWER CONTROL IN THE BASE-TO-MOBILE LINK OF A MOBILE RADIO SYSTEM WITH CODE DIVISION MULTIPLE ACCESS

[75] Inventors: Eros Gaiani; Valerio Palestini, both of Turin, Italy

[73] Assignee: CSELT - Centro Studi e Laboratori Telecomunicazioni S.p.A., Turin, Italy

[21] Appl. No.: 330,913

[22] Filed: Oct. 28, 1994

[30]  Foreign Application Priority Data

Dec. 2, 1993 [IT] Italy ................... TO93A0918

[51] Int. Cl.$^6$ ................................ H04J 13/02
[52] U.S. Cl. ............... 370/18.000; 375/200; 375/201; 379/58; 379/59; 455/33.1; 455/67.1; 455/69
[58] Field of Search ............... 370/18; 375/205, 375/200, 201; 455/33.1, 69, 67.1; 379/58, 59

[56]  References Cited

U.S. PATENT DOCUMENTS

| | | | |
|---|---|---|---|
| 4,495,648 | 1/1985 | Giger | 455/73 |
| 4,811,421 | 3/1989 | Havel et al. | 455/69 |
| 5,056,109 | 10/1991 | Gilhousen et al. | 375/1 |
| 5,257,283 | 10/1993 | Gilhousen et al. | 375/1 |
| 5,333,175 | 7/1994 | Ariyavisitakul | 379/58 |
| 5,345,598 | 9/1994 | Dent | 455/54.1 |
| 5,412,686 | 5/1995 | Ling | 375/200 |

FOREIGN PATENT DOCUMENTS

| | | | |
|---|---|---|---|
| WO92/21196 | 11/1992 | WIPO | 375/205 |
| WO93/21699 | 10/1993 | WIPO | 375/205 |

OTHER PUBLICATIONS

Klein S. Gilhousen, "On The Capacity Of A Cellular CDMA System", 1991 IEEE, 9 pages.
William C. Y. Lee, "Power Control In CDMA", 1991 IEEE, 4 pages.

*Primary Examiner*—Douglas W. Olms
*Assistant Examiner*—Melissa Kay Carman
*Attorney, Agent, or Firm*—Herbert Dubno

[57]  ABSTRACT

Power control in a base to mobile link of a mobile radio system is effected by measuring the carrier/interference ratio at each mobile station and transmitting information thereof, usually in terms of the inverse of that ratio, to the base station. Power is shared between the traffic channels which are active by assigning fractions thereto utilizing a power control factor as the coefficient typical of the channel and depending on the ratios for all of the stations, on the number of active channels, on whether or not there have been variations in the active channels relative to a preceding interval and on the power assigned to the channel in the preceding interval.

9 Claims, 2 Drawing Sheets

METHOD AND DEVICE FOR POWER CONTROL IN THE BASE-TO-MOBILE LINK OF A MOBILE RADIO SYSTEM WITH CODE DIVISION MULTIPLE ACCESS

FIELD OF THE INVENTION

The present invention relates to a mobile communications systems and, in particular, to a method of and a device for power control in the base-to-mobile link of a mobile radio system using direct sequence code division multiple access (DS-CDMA).

BACKGROUND OF THE INVENTION

In direct sequence code division multiple access (DS-CDMA), the binary information sequences individually generated by the users are multiplied by a respective very long pseudo-random sequence whose elements have a period (chip time) much smaller than the bit time of the information sequences, so that the energy of the signals from each user is uniformly spread over the whole system band. The pseudo-random sequence is typical of the user and represents a code for the same. The spread spectrum signals thus obtained are added together and sent to all users. At the receiving side, the information is recovered through decorrelation operations, by taking advantage of the code sequence. This technique maintains communication secrecy.

An essential requisite of a system using this technique is power control, which is particularly critical in the mobile-to-base link, and yet is also necessary in the base-to-mobile link in order not to affect the system capacity in comparison with the other link, for a given transmission quality.

In fact, in the mobile-to-base link it is essential that the signals sent towards the base station from different mobile stations locked thereto arrive at the base station ideally with the same power, because in the absence of power control the signals from a mobile station near the base station could completely mask the signals from a more distant out mobile station. To deal with this problem (commonly called the "near-far problem" in the art) a high level of dynamics is required for power control, usually in excess of 80 dB. In the base-to-mobile link, power control is less critical, as each mobile station receives from its base station a signal which is the sum of the useful signal (the signal actually intended for the mobile station itself) and of interfering signals (those intended for all other mobile stations). Both the useful signal and the interfering signals follow the same path within the cell, and there is no such problem as explained above. However, the interference due to signals from the base stations of adjacent cells must be taken into account, and it has been found that only by applying power control also in the base-to-mobile link a carrier/interference ratio of the same order as in the reverse link can be obtained. In this way, capacity is essentially the same in both links, for a given quality.

As regards power control in the mobile-to-base link, according to the most common technique each mobile station corrects the power level sent according to an estimate of the attenuation undergone in the base-to-mobile link by a pilot signal of known power level transmitted by the base station. Since the mobile-to-base link operates in a frequency band different from that of the base-to-mobile link, the attenuation estimated as above is not the same affecting the signal in the mobile-to-base link. Therefore, the power level of each mobile station is then corrected upon command from the base station according to the power level received at the latter. This technique is described for instance in the paper "On the Capacity of a Cellular CDMA System", by K. S. Gilhousen et al., IEEE Transactions on Vehicular Technology, Vol. 40, No. 2, May 1991, pages 303–311.

The possibility of carrying out a power control in the base-to-mobile link based on the distance of each mobile station from the base station is described in the paper "Power Control in CDMA" submitted by W. C. Y Lee to the VTS Conference, St. Louis, U.S.A., May 19–22, 1991, published on pages 77–80 of the Conference Proceedings. As a result of such control, the overall power transmitted by the base station is reduced, in that the base station transmits at a higher power level to mobile stations at the boundaries of the cell and at a lower power level to mobile stations near the base station. Practical application of this type of control is extremely difficult, as it causes continuous variation of the total power transmitted by the base station in a cell, which in turn prevents control of interference in adjacent cells.

Moreover, even if such a control could be implemented, it has been recognized in the literature that its performance would not be satisfactory (see the paper "Power Control in Cellular DS CDMA Systems, submitted by R. Prasad, M. Jansen and A. Kegel to COST 231 TD(92)-92, Helsinki, Finland, Sep. 8–11, 1992) and that better results can be obtained by performing power control in the base-to-mobile link on the basis of an estimate of the carrier/interference (C/I) ratio of each mobile station. This paper states that in this way the C/I ratio of each user is minimized according to his demands, although no indication is given of how to obtain such a result.

OBJECT OF THE INVENTION

The object of the present invention is precisely to provide a method of and a device for allowing a simple and performing implementation of power control in the base-to-mobile link based on an estimate of the C/I ratio.

SUMMARY OF THE INVENTION

According to the invention, there is provided a method in which each of the active mobile stations locked to a base station measures its own carrier/interference ratio and provides the base station with information, periodically updated, on such ratio. In this system of the invention total power P is shared among all traffic channels active for transmission towards the mobile stations by assigning to each of them, in a time interval in which the carrier/interference ratio values are kept valid, a fraction $Pi=\alpha_i \cdot P/N$ of such total power (where N is the number of active channels and $\alpha_i$ is a coefficient typical of the channel, hereinafter called power control factor) depending on the carrier/interference ratios of all the mobile stations, on the number of active channels in the interval, on whether or not there have been variations in the active channels relative to the preceding interval and on the power assigned to the channel in the preceding interval. The sharing of the power among the various traffic channels is such as to maintain constant, for a given number of active mobile stations, the total power transmitted by the base station to said mobile stations, and to equalize the carrier/interference ratios of all the mobile stations.

The invention also provides a device for implementing the method, in which each active mobile station locked to the base station of a cell sends to the base station information, periodically updated, on the respective carrier/interference ratio. This apparatus includes means for receiving such information and means for sharing among the various traffic channels towards the mobile stations the total power P available for transmission from the base station to the active mobile stations, so as to keep constant such total power, for a constant number of active channels, and to equalize the carrier/interference ratios of all the mobile stations, and in that the power sharing means are arranged to assign to each channel, in a time interval in which the carrier/interference ratios remain valid, a fraction $Pi=\alpha_i \cdot P/N$ of said total power P, where N is the number of active channels and $\alpha_i$ is a coefficient typical of the channel, called in the following power control factor, depending on the carrier/interference ratios of all the mobile stations, on the number of active channels, on whether or not there have been variations in the active channels with respect to the preceding interval and on the power sharing carried out in the preceding interval.

The invention also concerns a mobile communications system with code division multiple access, in which power control in the base-to-mobile link is carried out, in every cell, according to the method and with the device herein described.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
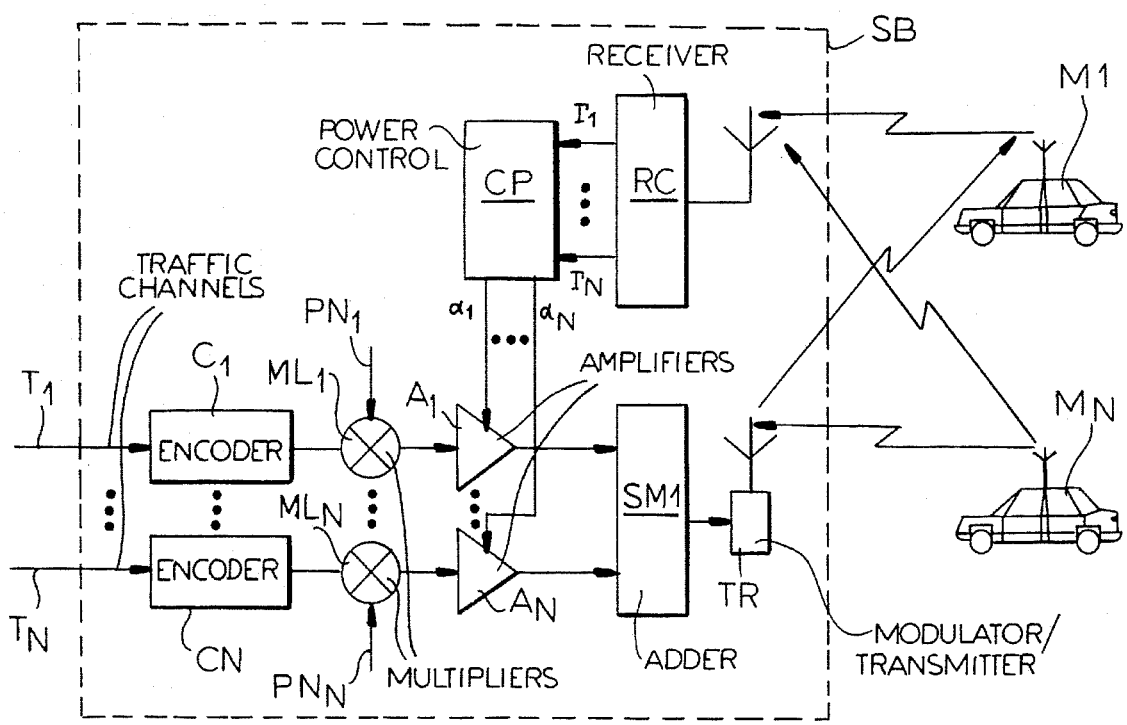
FIG. 1 is a diagram of the section for transmission towards mobile stations in a base station of a mobile radio system with code division multiple access, in which the present invention is used.

In FIG. 1, $T_1 \ldots T_N$ are the traffic channels carrying binary signal sequences relative to communications directed to the active mobile stations $M_1 \ldots M_N$, locked to base station SB. The sequences originate from respective sources, not shown. Both the nature of the communications (voice, data . . . ) and their origin (from a mobile station or from the fixed network) are not of interest for the present invention.

Signals sent along those channels can be coded in encoders $C_1 \ldots C_N$ and are then respectively multiplied by pseudo-random sequences or codes $PN_1 \ldots PN_N$ in multipliers $ML_1 \ldots ML_N$, resulting in spread spectrum signals occupying the whole available spectrum. These signals are then sent to variable gain amplifiers, $A_1 \ldots A_N$, which bring the signals of the respective channel up to a desired power level, meeting the criteria stated below. The signals outgoing from the amplifiers $A_i$ are then linearly added in adder SM1 and sent to conventional transmission means represented by block TR (within which modulation, filtering . . . , take place).

According to the present invention, each of the N active traffic channels is assigned a power $Pi=\alpha_i Po$, where P is the total power allotted to the transmission of N channels, $Po=P/N$ is the power that would be assigned to each channel in the absence of power control and $\alpha_i$ is a proportionality coefficient (referred to herein as the "power control factor") typical of the channel and determined so as to equalize the carrier/interference (C/I) ratios of all the active mobile stations and to keep the total power P constant. Coefficients $\alpha_i$ are determined and periodically updated by a power control device CP on the basis of value $\Gamma_i$ of the inverse of the C/I ratio at the various active mobile stations $M_i$. Device CP consequently adjusts the gain of amplifiers $A_i$. Values $\Gamma_i$ are periodically provided (typically, with a periodicity of the order of a few tens milliseconds or at most a hundred milliseconds) by the mobile stations to base station SB, e.g., through a signalling and control channel, analogously to what is done for the power measurements necessary for controlling power in the mobile-to-base link. Receiving devices are shown as a whole as block RC. All the base stations of the system are equipped with device CP.

In steady state operation (i.e., as long as there are no variations in the active channels), device CP operates for each traffic channel in every cycle (a cycle being a time interval in which the C/I ratios and hence values $\Gamma_i$ are kept valid) on the basis of three parameters: two of these are specific for the channel, namely value $\Gamma_i$ and the power control factor $\alpha_i$ calculated by CP in the preceding interval (indicated by $\alpha'_i$) 3. The third parameter depends upon the overall state of the system and is related to the number of active channels N and to the values $\Gamma_i$ and $\alpha'_i$ of all the active channels.

More particularly, value $\alpha_i$ is calculated by CP according to the following relation:

$$\alpha_i = H(1+\Gamma_i)\alpha'_i \qquad (1)$$

where H denotes the quantity $$H = N/\left(N + \sum_{i=1}^{N} \Gamma_i \cdot \alpha_i'\right). \qquad (2)$$

It can be immediately seen that power P is constant provided that in every interval coefficients $\alpha_i$ meet condition $$\sum_{i=1}^{N} \alpha_i = N.$$

If, in addition to the mobile stations already active, X further mobile stations $M_{j1} \ldots M_{jX}$ become active in a cycle, mobile stations $M_1 \ldots M_N$ transmit with the same power as in the preceding interval (therefore $\alpha_i = \alpha'_i$); power control factors $\alpha_{j1} = \ldots = \alpha_{jX} = 1$ are initially assigned to the newly active mobile stations $M_{j1} \ldots M_{jX}$, so as to meet the condition that the sum of all factors $\alpha$ equals the number of active mobile stations in the cell. Values of C/I ratios are then again equalized by applying relations (1) and (2).

In the opposite condition, in which X mobile stations $M_{j1} \ldots M_{jX}$ terminate communication, so that only N-X remain active, coefficients $\alpha_i$ ($i \neq j1 \ldots jX$) of the latter are updated according to the relation:

$$\alpha_i = \alpha_i' + K = \alpha_i' + \frac{\Delta j1 + \ldots + \Delta jX}{N-X} \qquad (3)$$

where $\Delta_h$ (h=j1 . . . jX) denotes the quantity $\alpha'_h - 1$. Therefore a same initial power variation occurs for all the mobile stations. It can easily be seen that relation (3) allows the condition $$\sum_{i=1}^{N-X} \alpha_i = N - X$$

to be met for all the mobile stations remaining active in the cell. In the next interval the C/I ratios are equalized again according to relations (1) and (2).

By equalizing the C/I ratios for all the mobile stations locked to a base station the performance of the worst traffic channel is improved. Since, as is known, a system is designed taking into account the worst case, it is clear that the invention allows improvement of the overall performance. Furthermore, as the total power transmitted by each base station (for a given number of active channels) is constant notwithstanding its periodic redistribution among the channels, interference into adjacent cells cannot vary in uncontrolled manner.

In the case of addition or release of active mobile stations in the cell, updating of power control factors $\alpha_i$ in the above mentioned way has the advantage of minimising C/I ratio variations, with respect to an alternative solution such as assigning again unit factors $\alpha_i$ to all channels.

Tables 1 and 2 attached show the values of coefficients $\alpha_i$ and C/I ratios in the absence of power control (Tables 1A, 2A) and in three different conditions of application of the invention, namely: steady-state power control, with N constant (Table 1B, 2B), activation of a further mobile station (Tables 1C, 1D), release of a mobile station (Tables 2C, 2D). C/I ratios in the absence of power control are obtained through computer simulation, by assigning to the mobile stations arbitrarily different distances from the base station and arbitrarily different shadowing conditions in the mobile-to-base link. For all the values shown in the tables only three decimal places are considered; the values of $\alpha_i$ are also rounded off, depending on the value of the digit in the fourth decimal place.

For a given number N of active channels, by applying the invention, the channel with the worst C/I ratio in the absence of power control is improved by about 4 dB. If a further mobile station becomes active, obviously all the C/I ratios worsen somewhat, yet to an extremely reduced extent (about 0.1 dB), as can be seen from Table 1D. Even the maximum degradation in the cycle in which the power must be shared among the new active channels is very limited (about 0.4 dB, see Table 1C).

Analogously, overall improvement and maximum improvement are very limited in the case of release of a mobile station (about 0.1 dB and about 0.2 dB, respectively). It then appears that thanks to the invention there are no sudden changes in the overall performance of the system when the number of active users varies.

For simplicity, the case was not considered in which in the same cycle one or more channels are released and one or more channels become active. On the other hand, this situation is highly unlikely, given the short duration of the working cycles given above. At any rate, should such a situation occur, it could be dealt with by handling the activation and the release of channels in succeeding stages.

Figure 2:
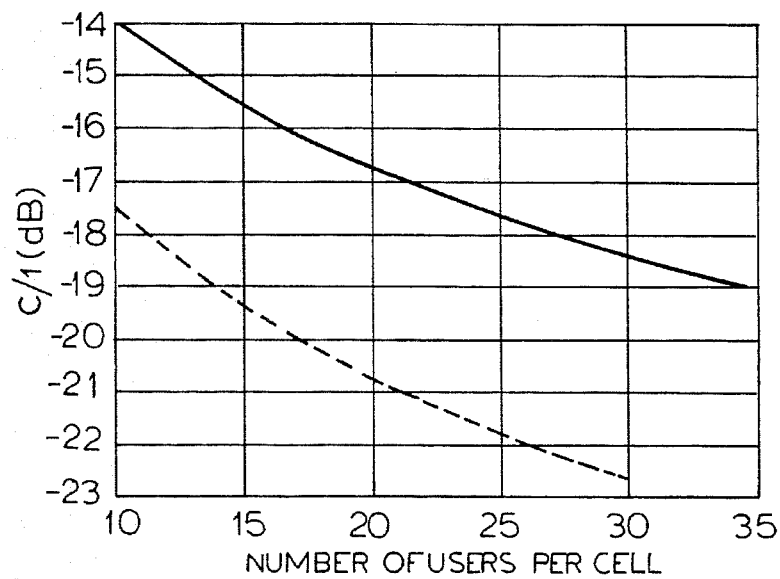
FIG. 2 is a graph depicting the performance of a system using the invention.

The advantages of the invention also appear from FIG. 2, which shows the C/I ratio versus the number of users per cell when using the invention (solid line) or without using it (dotted line) for the worst one of the mobile stations in a multicell system with omnidirectional antennas (which, for the case of ten users, essentially corresponds to the example in Table 1). The graph was plotted taking into account a 10% probability that the expected C/I ratio for a given number of users can be exceeded. It can be immediately seen that, by using the invention, the C/I ratio for the same number of users can be improved or, conversely, the number of users which can be served by a cell with the quality desired can be increased.

Figure 3:
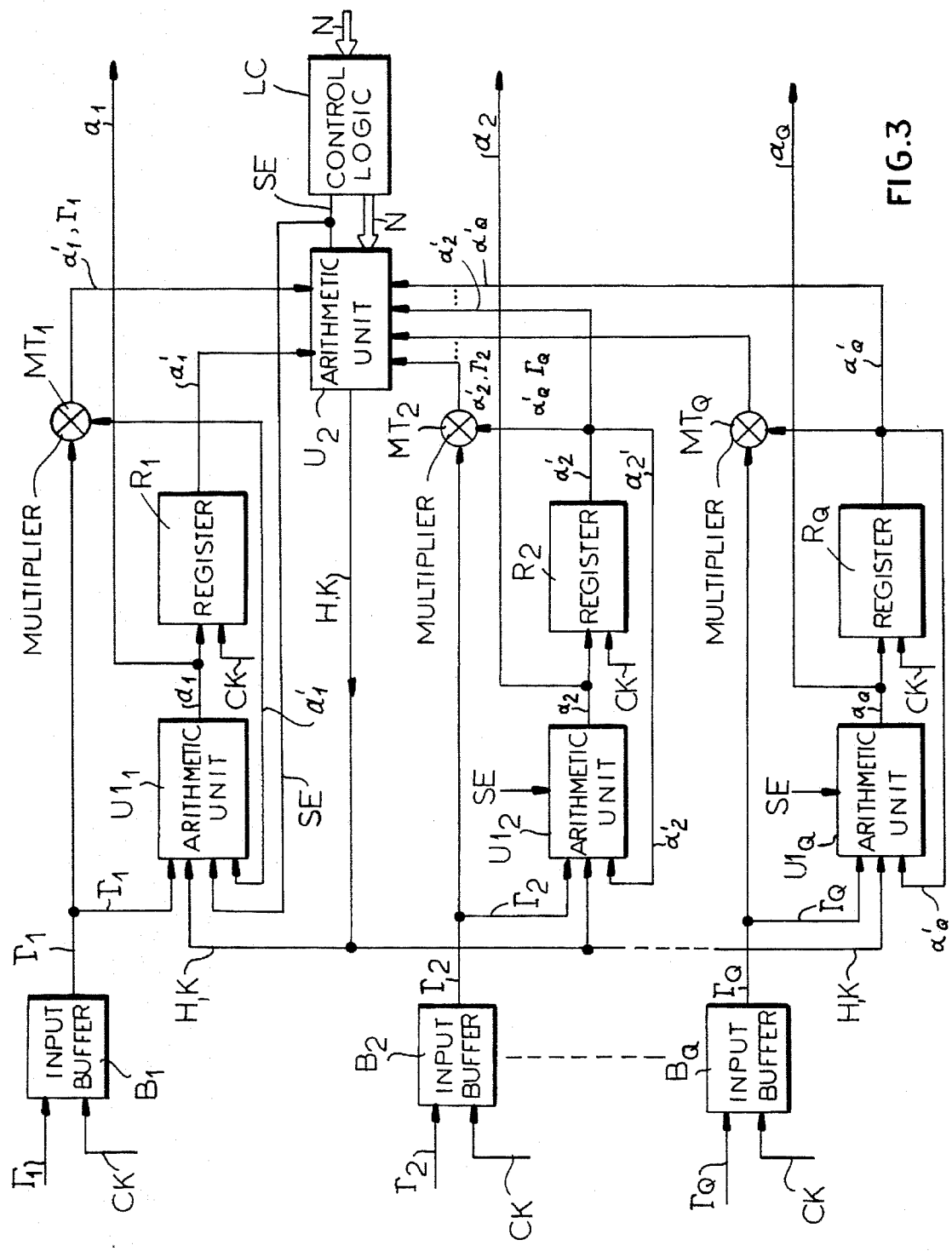
FIG. 3 is the block diagram of a device implementing the method of the invention.

FIG. 3 shows a possible implementation of the power control device CP, assuming that a maximum number Q of mobile stations (and hence of traffic channels) may be active at the same time in the cell. Even though FIG. 3 shows values $\Gamma$, $\alpha$, $\alpha'$ for all Q channels, it is clear that they will be present only for the active channels, indicated in the following with indices k1 ... kN (N≤Q).

This given, device CP includes, for each of the Q channels an input buffer memory or register $B_1, B_2 ... B_Q$, which temporarily stores the value $\Gamma$ provided by the respective mobile station when active; a first arithmetic unit $U1_1 ... U1_Q$ calculating power control factor $\alpha_1 ... \alpha_Q$; a second group of registers $R_1 ... R_Q$ supplying, at each cycle, values $\alpha'_1 ... \alpha'_Q$ assumed by the power control factors in the previous cycle; and multipliers $MT_1 ... MT_Q$ computing the products $\alpha'_i \cdot \Gamma_i$. Registers $B_1 ... B_Q$ are necessary in that values $\Gamma$ may not arrive all at the same time at the base station, whereas for the correct application of the algorithm it is necessary that they be simultaneously available to the downstream units. Therefore, values $\Gamma$ stored in registers $B_{ki}$ (i=1 ... N) associated with active channels are read all at the same time, upon command of a signal CK generated by a time base (not shown) of the base station. The same signal CK also commands reading, from registers $R_{ki}$, of the power control factors $\alpha'_{ki}$ calculated in the preceding cycle.

Units U1 receive: from a control logic LC, an operation mode selection signal SE indicating whether the active channels are the same as in the preceding interval, whether new channels have been activated or whether some channel has been released; from registers $R_{ki}$, factors $\alpha'_{ki}$; from a second computing unit U2, the parameter H given by relation (2) or the parameter K appearing in relation (3). When signal SE indicates that the active channels have remained unchanged, units U1 calculate factors $\alpha$ according to relation (1). When SE indicates that new channels have been activated, units U1 supplies, as values $\alpha$, the preceding value $\alpha'$ for the channels already active and value 1 for new channels. If some channels have been released, units U1 calculate values $\alpha$ for the remaining channels according to relation (3). Values $\alpha$ generated by units U1 are sent to amplifiers $A_i$ (FIG. 1) and to registers R for use in the next cycle.

Multipliers MT carry out the product of value $\Gamma$ and factor $\alpha'$, read from registers B, R associated with the respective traffic channel, and provide arithmetic unit U2 with products $\Gamma \cdot \alpha'$. Arithmetic unit also receives signal SE from control logic LC and values $\alpha'$ from registers R, and calculates parameter H or K when SE indicates that the active channels have remained unchanged or respectively that channels have been released. The information on the number of active channels is given to arithmetic unit control logic U2 by LC.

In order to generate signal SE, control logic LC has to receive in each cycle information on the state of each channel and to store it for a full cycle to be able to recognize newly activated channels or released channels. Basing on such information, control logic LC can immediately calculate the number of active channels N. Information of this kind is usually available in the control devices of the base station, which pass it to control logic LC as depicted by arrow N. Furthermore, the information that certain channels have been released must also be passed on to arithmetic unit U2 for calculating K. This information can be given by control logic LC together with the number N of active channels.

It is evident that the above description is given merely by way of a non limiting example, and that variants and modifications are possible without departing from the scope of the invention.

TABLE 1

| mobile | $\alpha_i$ | C/I (dB) | $\alpha_i$ | C/I (dB) |
|---|---|---|---|---|
| | A: no control | | B: control; N constant | |
| 1 | 1 | −11.148 | 0.556 | −13.839 |
| 2 | 1 | −17.130 | 2.088 | −13.839 |
| 3 | 1 | −17.527 | 2.285 | −13.839 |
| 4 | 1 | −10.948 | 0.533 | −13.839 |
| 5 | 1 | −9.545 | 0.397 | −13.839 |
| 6 | 1 | −9.566 | 0.399 | −13.839 |
| 7 | 1 | −15.233 | 1.363 | −13.839 |
| 8 | 1 | −9.565 | 0.399 | −13.839 |
| 9 | 1 | −9.709 | 0.411 | −13.839 |
| 10 | 1 | −15.860 | 1.569 | −13.839 |
| | C: N = 11; updated $\alpha_i$ | | D: N = 11; new control | |
| 1 | 0.556 | −14.150 | 0.586 | −13.915 |
| 2 | 2.088 | −13.924 | 2.093 | −13.915 |
| 3 | 2.285 | −13.917 | 2.286 | −13.915 |
| 4 | 0.533 | −14.163 | 0.563 | −13.915 |
| 5 | 0.397 | −14.269 | 0.429 | −13.915 |
| 6 | 0.399 | −14.267 | 0.431 | −13.915 |
| 7 | 1.363 | −13.969 | 1.380 | −13.915 |
| 8 | 0.399 | −14.267 | 0.431 | −13.915 |
| 9 | 0.411 | −14.255 | 0.443 | −13.915 |
| 10 | 1.569 | −13.952 | 1.582 | −13.915 |
| 11 | 1.000 | −12.764 | 0.776 | −13.915 |

TABLE 2

| mobile | $\alpha_i$ | C/I (dB) | $\alpha_i$ | C/I (dB) |
|---|---|---|---|---|
| | A: no control | | B: control; N constant | |
| 1 | 1 | −11.198 | 0.610 | −13.472 |
| 2 | 1 | −9.549 | 0.431 | −13.472 |
| 3 | 1 | −12.375 | 0.786 | −13.472 |
| 4 | 1 | −9.575 | 0.433 | −13.472 |
| 5 | 1 | −16.111 | 1.800 | −13.472 |
| 6 | 1 | −12.311 | 0.776 | −13.472 |
| 7 | 1 | −17.287 | 2.347 | −13.072 |
| 8 | 1 | −15.564 | 1.592 | −13.472 |
| 9 | 1 | −11.357 | 0.631 | −13.472 |
| 10 | 1 | −11.070 | 0.593 | −13.472 |
| | C: N = 9; updated $\alpha_i$ | | D: N = 9; new control | |
| 1 | 0.585 | −13.329 | 0.577 | −13.389 |
| 2 | 0.406 | −13.265 | 0.395 | −13.389 |
| 3 | 0.762 | −13.363 | 0.757 | −13.389 |
| 4 | 0.408 | −13.266 | 0.397 | −13.389 |
| 5 | 1.775 | −13.425 | 1.789 | −13.389 |
| 7 | 2.322 | −13.436 | 2.346 | −13.389 |
| 8 | 1.568 | −13.419 | 1.578 | −13.389 |
| 9 | 0.606 | −13.334 | 0.599 | −13.389 |
| 10 | 0.569 | −13.325 | 0.561 | −13.389 |

We claim:

1. A method of power control in a base-to-mobile link of a mobile radio system with code division multiple access, in which each of a plurality of active mobile stations ($M_1 \ldots M_N$) locked to a base station (SB) and having respective traffic channels measures its own carrier/interference ratio C/I and provides the base station (SB) with information, periodically updated, on said ratio, said method comprising sharing a total power P among all traffic channels active for transmission towards the mobile stations by assigning to each of them, in a time interval in which C/I ratio values are kept valid, a fraction $Pi=\alpha_i.P/N$ of such total power, where N is a number of active channels and $\alpha_i$ is a power control factor coefficient typical of the channel depending on the C/I ratios of all the mobile stations, on the number of active channels in the interval, on whether or not there have been variations in the active channels relative to the preceding interval and on the power assigned to the channel in the preceding interval, the sharing of the power among the various traffic channels being such as to maintain constant, for a given number of active mobile stations, the total power transmitted by the base station (SB) to said mobile stations ($M_1 \ldots M_N$), and to equalize the carrier/interference ratios C/I of all the mobile stations ($M_1 \ldots M_N$).

2. The method defined in claim 1 wherein the information on the carrier/interference ratio sent by the mobile stations ($M_1 \ldots M_N$) is an inverse ($\Gamma_1 \ldots \Gamma_N$) of such ratio.

3. The method defined in claim 2 wherein in each interval in which there are no variations in the active channels, the power control factor $\alpha_i=H(1+Ti.\alpha'_i)$, where $\alpha'_i$ is the value of the power control factor for that channel in the preceding interval, $\Gamma i$ is said inverse and H is a parameter given by $$H = N / \left( N + \sum_{i=1}^{N} \Gamma_i \cdot \alpha_i' \right).$$

4. The method defined in claim 1 wherein in said time interval in which new traffic channels are activated, each already active channel is assigned the same value $\alpha'_i$ of the power control factor as assigned in the preceding interval and new channels are assigned a unit power control factor.

5. The method defined in claim 1 wherein traffic channels are released in a time interval and wherein said time interval in which traffic channels are released, the power control factor for each channel remaining active is determined according to relation $$\alpha_i = \alpha_i' + \frac{\Delta j_1 + \ldots + \Delta j_x}{N - X},$$

where X is the number of channels released and $\Delta jh = \alpha'jh-1, \alpha'jh \; (h=1 \ldots X)$ being the power control factor assigned in the preceding interval by the generic released channel.

6. A device for power control in the base-to-mobile link within each cell of a mobile radio system with code division multiple access, in which each active mobile station $M_1 \ldots M_N$) locked to a base station (SB) of the cell sends to the base station (SB) information, periodically updated, on a respective carrier/interference ratio, said device comprising power sharing means ($B_1 \ldots B_Q$) for receiving said information and means ($U1_1 \ldots U1_Q, R_1 \ldots R_Q, MT_1 \ldots MT_Q$, U2, LC) for sharing among various traffic channels towards the mobile stations a total power P available for transmission from the base station to the active mobile stations, so as to keep constant such total power, for a constant number of active channels, and to equalize the carrier/interference ratios of all the mobile stations, the power sharing means ($U1_1 \ldots U1_Q, R_1 \ldots R_Q, MT_1 \ldots MT_Q$, U2, LC) assigning to each channel, in a time interval in which the carrier/interference ratios remain valid, a fraction $Pi=\alpha_i P/N$ of said total power P, where N is a number of active channels and $\alpha_i$ is a power control factor coefficient typical of the channel, depending on the carrier/interference ratios of all the mobile stations, on the number of active channels, on whether or not there have been variations in the active channels with respect to the preceding interval and on power sharing carried out in the preceding interval.

7. The device defined in claim 6 wherein said power sharing means comprises:

a first group of arithmetic units ($U1_1 \ldots U1_Q$), whose number is the same as the maximum number of channels which can be active at the same time, the arithmetic units associated with active channels determining the power control factor coefficient ($\alpha_1 \ldots \alpha_N$) for the respective channel according to one out of three operation modes, respectively corresponding to no variation in active channels, activation of new channels or release of channels with respect to the preceding interval, the various power control factor coefficients ($\alpha_1 \ldots \alpha_N$) being supplied to amplifying means ($A_1 \ldots A_N$) in a transmission section of the base station (SB);

a first group of registers ($R_1 \ldots R_Q$) connected each of said arithmetic units ($U1_1 \ldots U1_Q$), the registers associated with the active channels storing the power control factor coefficients ($\alpha_1 \ldots \alpha_N$) calculated by the respective first arithmetic unit ($U1_1 \ldots U1_Q$) for the whole validity interval of the carrier/interference ratios;

means ($MT_1 \ldots MT_Q$; U2) that, in a first and in a third operation mode, calculate and supply the first arithmetic units ($U1_1 \ldots U1_Q$) associated with the active channels with a first and respectively a second parameter (H,K) to be used in updating the power control factors; and a control logic network (LC), receiving from control devices of the base station information on the active channels and generating a signal (SE) for selection of the operation mode, which signal is passed to the first arithmetic unit ($U1_1 \ldots U1_Q$) and to the means ($MT_1 \ldots MT_Q$; U2) calculating said first and second parameters, the control logic network also providing the latter means with at least the number of active channels in the interval.

8. The device defined in claim 7 wherein the first arithmetic units ($U1_1 \ldots U1_Q$):

in the first operation mode, determine the power control factor according to the ratio $\alpha_i = H(1 + \alpha'_i \cdot \Gamma'i)$ where $\alpha'_i$ is the value of the power control factor for the i-th channel in the preceding interval, $\Gamma i$ is an inverse of the carrier/interference ratio of the mobile stations and H is said first parameter, given by the relation $$H = N / \left( N + \sum_{i=1}^{N} \Gamma_i \alpha_i' \right);$$

in a second operation mode, determine the power control factor by assigning to channels already active in the preceding interval the value ($\alpha'_i$) of said power factor in said preceding interval, and by assigning to newly active channels a power control factor value; $\alpha_i$ and in a third operation mode, determine the power control factor for the still active channels according to the relation $\alpha_i = \alpha'_i + K$, where K is said second parameter, given by the relation $$K = \frac{\Delta j_1 + \ldots + \Delta j_x}{N - X},$$

where X is the number of released channels and $\Delta j_h$ (h=1 ... X) indicates the quantity $\alpha'_{j_h} - 1$ for the channel released.

9. The device defined in claim 7 which further includes a second group of registers ($B_1 \ldots B_Q$) each of which temporarily stores a value ($\Gamma_1 \ldots \Gamma_Q$) of the inverse of carrier/interference ratio supplied by the corresponding active mobile station ($M_1 \ldots M_N$), all of said registers in the second group being read at a time when all the values are present, on command of a timing signal (CK) effecting simultaneous reading of the registers ($R_1 \ldots R_Q$) of the first group.

* * * * *